US011765107B2

(12) United States Patent
Jang et al.

(10) Patent No.: US 11,765,107 B2
(45) Date of Patent: Sep. 19, 2023

(54) METHOD AND SYSTEM FOR PROVIDING RELEVANCE INFORMATION BETWEEN USERS

(71) Applicant: LINE Plus Corporation, Seongnam-si (KR)

(72) Inventors: Hyukjae Jang, Seongnam-si (KR); Ji Hyeon Park, Seongnam-si (KR); Hyeyoung Kwon, Seongnam-si (KR); Youngjae Kim, Seongnam-si (KR); Jong Min Kim, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/344,626

(22) Filed: Jun. 10, 2021

(65) Prior Publication Data

US 2021/0409354 A1    Dec. 30, 2021

(30) Foreign Application Priority Data

Jun. 25, 2020 (KR) .................. 10-2020-0077750

(51) Int. Cl.
*H04L 51/04* (2022.01)
*H04L 67/303* (2022.01)
(Continued)

(52) U.S. Cl.
CPC ............. *H04L 51/04* (2013.01); *G06F 18/22* (2023.01); *H04L 51/222* (2022.05); *H04L 51/52* (2022.05); *H04L 67/303* (2013.01); *H04L 67/306* (2013.01)

(58) Field of Classification Search
CPC ......... H04L 51/04; H04L 51/20; H04L 51/32; H04L 67/303; H04L 67/306; G06K 9/6215
See application file for complete search history.

(56) References Cited

U.S. PATENT DOCUMENTS 8,225,413 B1 * 7/2012 De ..................... G06F 21/6245
726/22
10,708,216 B1 * 7/2020 Rao ......................... H04L 51/52
(Continued)

FOREIGN PATENT DOCUMENTS

KR      10-1302599 B1     8/2013
KR   10-2013-0125274 A    11/2013
(Continued)

OTHER PUBLICATIONS

Kakaotalk, "There's a red dot next to your friend's name. It turned out that because of "This"" Asian Economy Online Issue Team (2015).
(Continued)

*Primary Examiner* — Nicholas R Taylor
*Assistant Examiner* — Tania M Pena-Santana
(74) *Attorney, Agent, or Firm* — Harness, Dickey & Pierce, P.L.C.

(57) ABSTRACT

A method for providing relevance information between users performed by one or more processors of a user terminal including receiving, from a user, a request for the relevance information between a first user account and a second user account of an instant messaging application from a user of the user terminal, collecting message information in a group chat room that includes the first user account, the second user account, and one or more additional user accounts, extracting a conversation between the first user account and the second user account from the collected message information, and displaying the extracted conversation between the first user account and the second user account along with information on the group chat room on a display of the user terminal, in which the first user account is associated with the user terminal, may be provided.

20 Claims, 11 Drawing Sheets

(51) Int. Cl.
*H04L 67/306* (2022.01)
*H04L 51/52* (2022.01)
*H04L 51/222* (2022.01)
*G06F 18/22* (2023.01)

(56) References Cited

U.S. PATENT DOCUMENTS

| | | | | |
|---|---|---|---|---|
| 2006/0031362 | A1* | 2/2006 | Chacko | G06Q 10/107 709/206 |
| 2007/0061405 | A1* | 3/2007 | Keohane | G06Q 10/109 709/207 |
| 2007/0198646 | A1* | 8/2007 | Chen | H04L 12/1822 709/207 |
| 2009/0254616 | A1* | 10/2009 | Cheung | H04L 12/1827 709/204 |
| 2010/0325107 | A1* | 12/2010 | Kenton | G06Q 30/00 707/723 |
| 2011/0191433 | A1* | 8/2011 | Du | G06Q 10/107 709/206 |
| 2013/0024516 | A1* | 1/2013 | Blinder | H04L 51/32 709/204 |
| 2014/0325601 | A1* | 10/2014 | Sun | H04L 51/04 726/4 |
| 2015/0172244 | A1 | 6/2015 | Jeong | |
| 2015/0326678 | A1 | 11/2015 | Joo et al. | |
| 2016/0246460 | A1* | 8/2016 | Cao | G06F 3/0486 |
| 2017/0269800 | A1 | 9/2017 | Park et al. | |
| 2017/0372056 | A1* | 12/2017 | Narasimhan | G06F 21/32 |
| 2020/0014643 | A1* | 1/2020 | Moon | G06Q 20/322 |
| 2020/0286007 | A1* | 9/2020 | Tareen | G06Q 10/025 |
| 2020/0356587 | A1* | 11/2020 | Harijan | G06F 16/3344 |

FOREIGN PATENT DOCUMENTS

| | | |
|---|---|---|
| KR | 10-2013-0143683 A | 12/2013 |
| KR | 10-2014-0014681 A | 2/2014 |
| KR | 10-2014-0074019 A | 6/2014 |
| KR | 10-2014-0120982 A | 10/2014 |
| KR | 10-2015-0015058 A | 2/2015 |
| KR | 10-2016-0087268 A | 7/2016 |
| KR | 10-2016-0132584 A | 11/2016 |

OTHER PUBLICATIONS

Oh Daeseok "Tinder launches new photo authentication technology for safer use environment," (2020).

* cited by examiner

METHOD AND SYSTEM FOR PROVIDING RELEVANCE INFORMATION BETWEEN USERS

CROSS-REFERENCE TO RELATED APPLICATION

This application claims priority under 35 U.S.C § 119 to Korean Patent Application No. 10-2020-0077750, filed in the Korean Intellectual Property Office on Jun. 25, 2020, the entire contents of which are hereby incorporated by reference.

BACKGROUND

Technical Field

The present disclosure relates to methods and/or systems for providing relevance information between users, and more specifically, to methods and/or systems for providing relevance information between users, which include extracting and providing interaction information, relation information, and the like between users.

Description of the Related Art

With the proliferation of mobile devices such as smartphones or the like and the development of the Internet, instant messaging services using mobile devices are widely used. Users of the instant messaging service can naturally communicate with each other and share various contents in their daily life. In the conventional instant messaging application, since most of the conversations between users are those between friends, it is not easy to check information on users who are non-friends.

As the culture of remote and telecommuting has spread in accordance with the recent rise of a non-contact society, the use of instant messaging services is rapidly increasing as a collaboration tool that supports face-to-face contact-free works. In such an environment, interactions on the instant messaging applications between users who are non-friends are increasing. However, for those users who are non-friends, since there is provided only certain limited information such as profile images, names, and the like set by the corresponding users, there is a difficulty in specifying who the corresponding users are. Therefore, on the instant messaging application it is necessary to provide various information on other users who are non-friends.

SUMMARY

In order to solve the problems described above, the present disclosure provides methods for, a non-transitory computer-readable recording mediums storing instructions for, and apparatuses (systems) for providing relevance between users.

The present disclosure may be implemented in a variety of ways, including methods, apparatuses (systems), or non-transitory computer-readable storage mediums storing instructions.

According to an example embodiment, a method for providing relevance information between users, performed by one or more processors of a user terminal, includes receiving, the one or more processors, a request for relevance information between a first user account and a second user account of an instant messaging application form a user of the user terminal, collecting, the one or more processors, message information in a group chat room that includes the first user account, the second user account, and one or more additional user accounts, extracting, the one or more processors, conversation between the first user account and the second user account from the collected message information, and displaying, the one or more processors, the extracted conversation between the first user account and the second user account along with information on the group chat room, in which the first user account is associated with the user terminal, on a display of the user terminal.

According to an example embodiment, the extracting may include calculating a correlation score between a first message of the first user account and a second message of the second user account using a language model, and in response to determining that the calculated correlation score is equal to or greater than a threshold value, extracting the first message and the second message as the conversation between the first user account and the second user account.

According to an example embodiment, the receiving may include receiving the request for the relevance information from the user through a profile page of the second user account displayed on the display.

According to an example embodiment, the method may further include, in response to receiving the selection from the user for the mention message displayed on the display, moving to a location of the mention message in the group chat room.

According to an example embodiment, the method may further include extracting, at least one of a first mention message in which the first user account mentions the second user account or a second mention message in which the second user account mentions the first user account, from the collected message information, and displaying the extracted at least one of the first mention message or the second mention message along with information on the group chat room, on the display.

According to an example embodiment, the method may further include, in response to receiving a selection of a mention message from the user for the extracted at least one of the first mention message or the second mention message displayed on the display, moving to a location of the selected mention message in the group chat room.

According to an example embodiment, the method may further include displaying information on a plurality of chat rooms that include both the first user account and the second user account on the display. The plurality of chat rooms may include a group chat room.

According to an example embodiment, the method may further include displaying statistical information on the group chat room on the display, in which the statistical information on the group chat room may include at least one of: an average number of messages input by the first user account per day in the group chat room, an average number of messages input by the second user account per day in the group chat room, an activity score of the group chat room, an activity score of the first user account in the group chat room, or an activity score of the second user account in the group chat room.

According to an example embodiment, the activity score of the second user account in the group chat room may be calculated based on: a ratio of a number of messages of the second user account in the group chat room to a total number of messages in the group chat room, a ratio of the number of messages of the second user account in the group chat room to a total number of messages in all chat rooms that include the second user account, and a number of user accounts included in the group chat room.

According to an example embodiment, the method may further include displaying information on a third user account who is a mutual friend of the first user account and the second user account on the display.

According to an example embodiment, the method may further include, in response to determining that the second user account is a non-friend of the first user account, displaying the relevance information between the first user account and the second user account on a screen of an 1:1 chat room that includes the first user account and the second user account. The relevance information may include at least one of: information on a third user account who is a mutual friend of the first user account and the second user account, the information on the group chat room that includes both the first user account and the second user account, or information related to the extracted conversation between first user account and the second user account.

According to an example embodiment, the method may further include displaying an authentication icon indicating that a profile image of the second user account is an image obtained by capturing a face of another user associated with the second user account, along with the profile image of the second user account, on the display.

According to an example embodiment, the method may further include displaying access country information of the second user account along with a profile image of the second user account on the display.

According to an example embodiment, the method may further include displaying a profile change icon indicating that a profile image of the second user account has changed within a period of time, along with the profile image of the second user account on the display.

According to an example embodiment, the method may further include calculating a similarity between profile information of a fourth user account who is a friend of the first user account and profile information of the second user account, and in response to determining that the calculated similarity is equal to or greater than a threshold value, displaying an impersonation warning message on the display.

According to an example embodiment, the method may further include determining a ranking in which the second user account is exposed in a recommended friend list based on an importance score of the second user account calculated based on the relevance information between the first user account and the second user account.

According to an example embodiment, the importance score of the second user account may be calculated based on at least one of: the extracted conversation between the first user account and the second user account, an activity score of the group chat room, a number of chat rooms that include both the first user account and the second user account, whether or not a profile image of the second user account is an image obtained by capturing a face of first another user associated with the second user account, whether or not a face of second another user associated with the first user account is included in the profile image of the second user account, a number of images including the face of the user associated with the second user account among images stored in the user terminal, a number of times the first user account inputs a mention message mentioning the second user account in the group chat room, or a number of times the second user account inputs a mention message mentioning the first user account in the group chat room.

According to an example embodiment, the method may further include displaying information related to an item of highest weight along with a profile information of the second user account in the recommended friend list.

According to an example embodiment, there is provided a non-transitory computer-readable recording medium storing instructions thereon that when executed by one or more processors, cause a computer to perform the method for providing relevance information between users described above.

The user terminal according to an example embodiment may include a memory configured to store one or more computer-readable programs, a display, and one or more processors connected to the memory and configured to execute the one or more computer-readable programs included in the memory such that the one or more processors are configured to cause the user terminal to collect message information in a group chat room that includes a first user account, a second user account, and one or more additional user accounts in response to a request for relevance information between the first user account and the second user account of an instant messaging application, extract conversation between the first user account and the second user account from the collected message information, and display, the extracted conversation between the first user account and the second user account along with information on the group chat room on the display. The first user account is associated with the user terminal.

According to some example embodiments of the present disclosure, the first user can easily check whether or not there is a mention message in which the first user and the second user mention each other, information on a chat room that includes the mention message, the time when the mention message is sent, and the like, by a simple touch input or the like.

According to some example embodiments of the present disclosure, the first user can easily check whether or not the second user who sent the message is intentionally manipulating a profile image and a name to impersonate another user who is a friend of the first user.

According to some example embodiments of the present disclosure, for friend recommending, a recommendation ranking may be determined based on the relevance information between users, such that a user with a high probability that the first user would add as a friend may be displayed at the top of the recommended friend list. Further, the reason for recommending each recommended user may be displayed together in the recommended friend list, such that the first user may easily and quickly check the relevance between the first user himself/herself and the recommended user.

BRIEF DESCRIPTION OF THE DRAWINGS

Some example embodiments of the present disclosure will be described with reference to the accompanying drawings described below, where similar reference numerals indicate similar elements, but embodiments are not limited thereto, in which.

DETAILED DESCRIPTION

Figure 1:
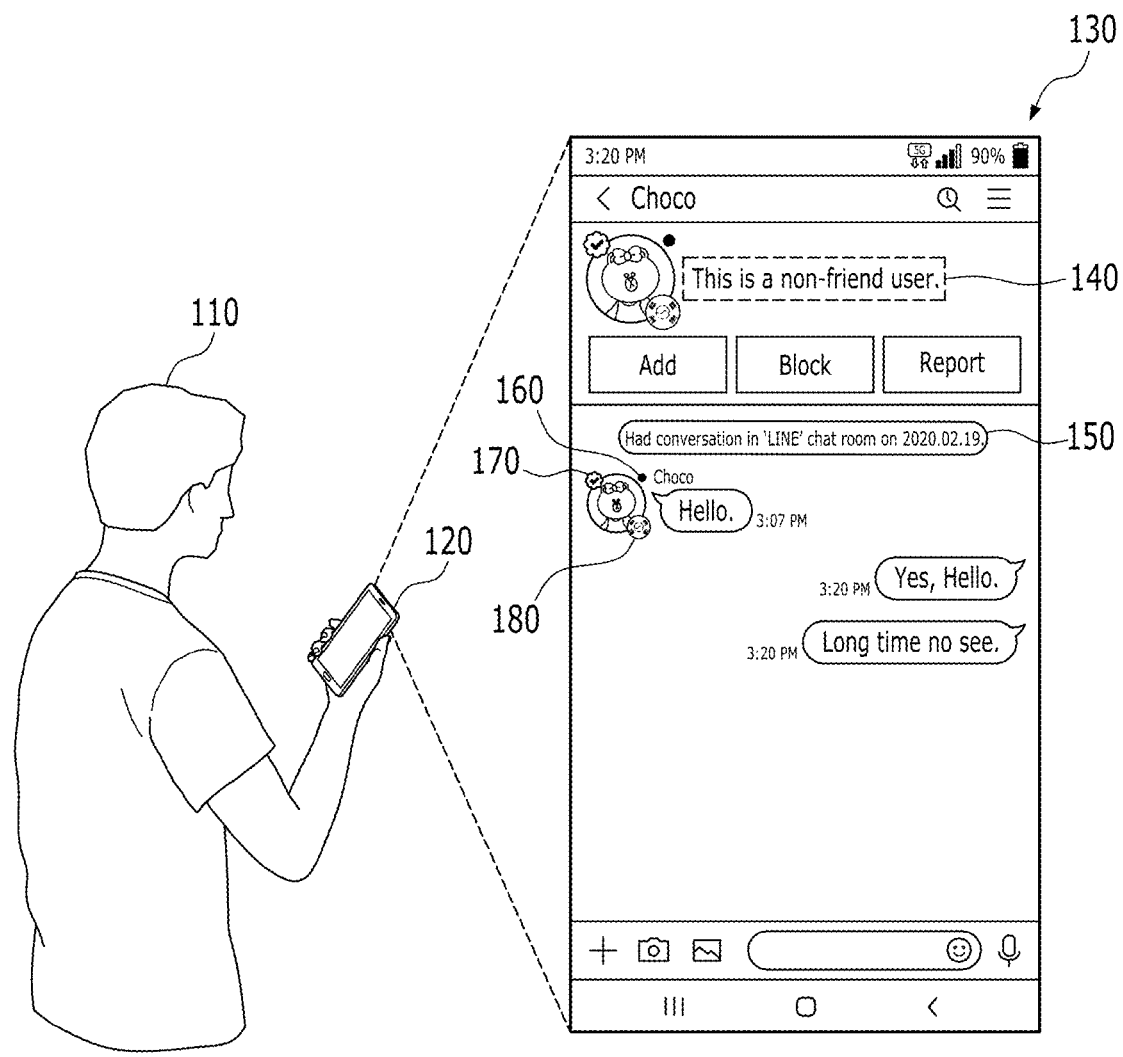
FIG. 1 is a diagram illustrating an example in which relevance information between users is provided through an instant messaging application operating in a user terminal according to an example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. Further, in the following description of the embodiments, duplicate descriptions of the same or corresponding components may be omitted. However, even if descriptions of components are omitted, it is not intended that such components are not included in any embodiment.

Advantages and features of the present disclosure will be apparent by referring to the example embodiments described below in connection with the accompanying drawings. However, the present disclosure is not limited to the disclosed example embodiments disclosed below, and may be implemented in various different forms, and the present embodiments are merely provided to make the present disclosure complete, and to fully disclose the scope of example embodiments to those skilled in the art to which the present disclosure pertains.

The terms used herein will be briefly described prior to describing the disclosed example embodiments in detail. The terms used herein have been selected as general terms which are widely used at present in consideration of the functions of the present disclosure, and this may be altered according to the intent of an operator skilled in the art, conventional practice, or introduction of new technology. Further, in a specific case, a term is arbitrarily selected by the applicant, and the meaning of the term will be described in detail in a corresponding description of the example embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an example embodiment, the "module" or "unit" may be implemented as a processor and/or a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. Further, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with a processor is in electronic communication with the processor.

In the present disclosure, "relevance information" may include any information indicating a relevance between two users on an instant messaging application. According to an example embodiment, the relevance information may include relation information and interaction information. The relation information between two users may include information on a chat room that includes the two users together, information on a mutual friend of the two users, and the like. The interaction information between the two users may include a conversation between the two users, information on a message that the two users mentioned each other, and the like.

In the present disclosure, a "group chat room" may refer to all chat rooms on the instant messaging application that include three or more users. For example, the group chat room may include a 1:N chat room, an open chat room, and so on, that includes three or more users.

In the present disclosure, the "user account" may represent an account created and used by a user in an instant messaging application or data related thereto. Further, the user account of the instant messaging application may refer to a user who uses the instant messaging application. Likewise, a user who uses instant messaging or a chat room capable of instant messaging may refer to the user account of the instant application. Further, the user account may include one or more user accounts.

In the present disclosure, a "mention message" may be a message mentioning another user that is included in the same chat room. For example, the mention message may be a message combining a tag (e.g., @) and the name of a user subscribed to the instant messaging application to mention the corresponding user.

FIG. 1 is a diagram illustrating an example in which relevance information between users is provided through an instant messaging application operating in a user terminal 120 according to an example embodiment. The user 110 may use the user terminal 120 to exchange messages with other users subscribed to the instant messaging application. According to an example embodiment, the user 110 may exchange messages with other users on the instant messaging application, in which the other users may or may not be friends with the user.

When the user 110 receives a message on the instant messaging application from another user (e.g., Choco) who is a non-friend, a 1:1 chat room interface 130 between the user 110 and another user may be displayed on the display of the user terminal 120. The 1:1 chat room interface 130 may include relevance information between the user 110 and another user ("Choco"). As illustrated, the relevance information may include relation information 140 such as "This is a non-friend user" or the like, and interaction information 150 such as "Had conversation in 'LINE' chat room on 2020.02.19" or the like.

FIG. 1 illustrates that the message "This is a non-friend user" as the relation information 140 is displayed on the display of the user terminal 120, but example embodiments are not limited thereto. For example, the relation information 140 may include information on a chat room (1:1 chat room, group chat room, 1:N chat room, and the like) that includes both the user 110 and another user ("Choco") together, and information on a mutual friend of the user 110 and another user ("Choco"). Further, FIG. 1 illustrates that the message "Had conversation in 'LINE' chat room on 2020.2.19" is displayed on the display of the user terminal 120 as the interaction information 150, but example embodiments are not limited thereto. For example, the interaction information 150 may include a conversation done in the past between the user 110 and another user ("Choco"), a mention message in which the user 110 mentioned another user ("Choco") in the past, information on a mention message in which another user ("Choco") mentioned the user 110 in the past, and the like.

According to an example embodiment, information on another user ("Choco") who sent the message may be displayed on the display of the user terminal 120. For example, a username, a profile image, and the like set by another user may be displayed on the display. Further, an icon 160 indicating that another user ("Choco") who sent the message has changed the profile image recently (e.g., within a week), an icon 170 indicating that the profile image of another user ("Choco") is a photograph of himself/herself, and an access country icon 180 of another user ("Choco") may be displayed on the display. For example, the icons 160, 170, 180 may be displayed on or near the profile image of another user ("Choco").

FIG. 1 illustrates that a one-sentence message is displayed on the display as the relation information 140 and the interaction information 150, respectively, but example embodiments are not limited thereto. According to an example embodiment, any relation information and any interaction information between two users may be displayed on the display. According to another example embodiment, when the one-sentence messages are displayed on the display as the relation information 140 and the interaction information 150, respectively, and when the user 110 selects the relation information 140 or the interaction information 150 displayed on the display by a touch input or the like, all relation information or all interaction information between the two users may be displayed on the display.

On the instant messaging application, by displaying on the display the relation information 140, the interaction information 150, and the icons 160, 170, 180 related to another user ("Choco") who is a non-friend along with the message (e.g., "Hello") sent by another user ("Choco"), the user 110 can easily and quickly check various information on another user ("Choco"). Based on this various information, the user 110 can intuitively check who this another non-friend user ("Choco") is.

In FIG. 1, when the user 110 and another user ("Choco") are friends, it is illustrated that the relation information 140, the interaction information 150, and the icons 160, 170, 180 are displayed on the display, but example embodiments are not limited thereto. For example, when the user 110 and another user are friends on the instant messaging application, the relation information 140, the interaction information 150, and the icons 160, 170, 180 may still be displayed on the display. By displaying the relation information 140, the interaction information 150, the icons 160, 170, 180, and the like of another user who is a friend of the user 110 on the display, the user 110 can easily and quickly check information such as a conversation shared recently in the group chat room that includes both the user 110 and another user together, information on a mutual friend, and the like, without having to separately search for the same.

Figure 2:
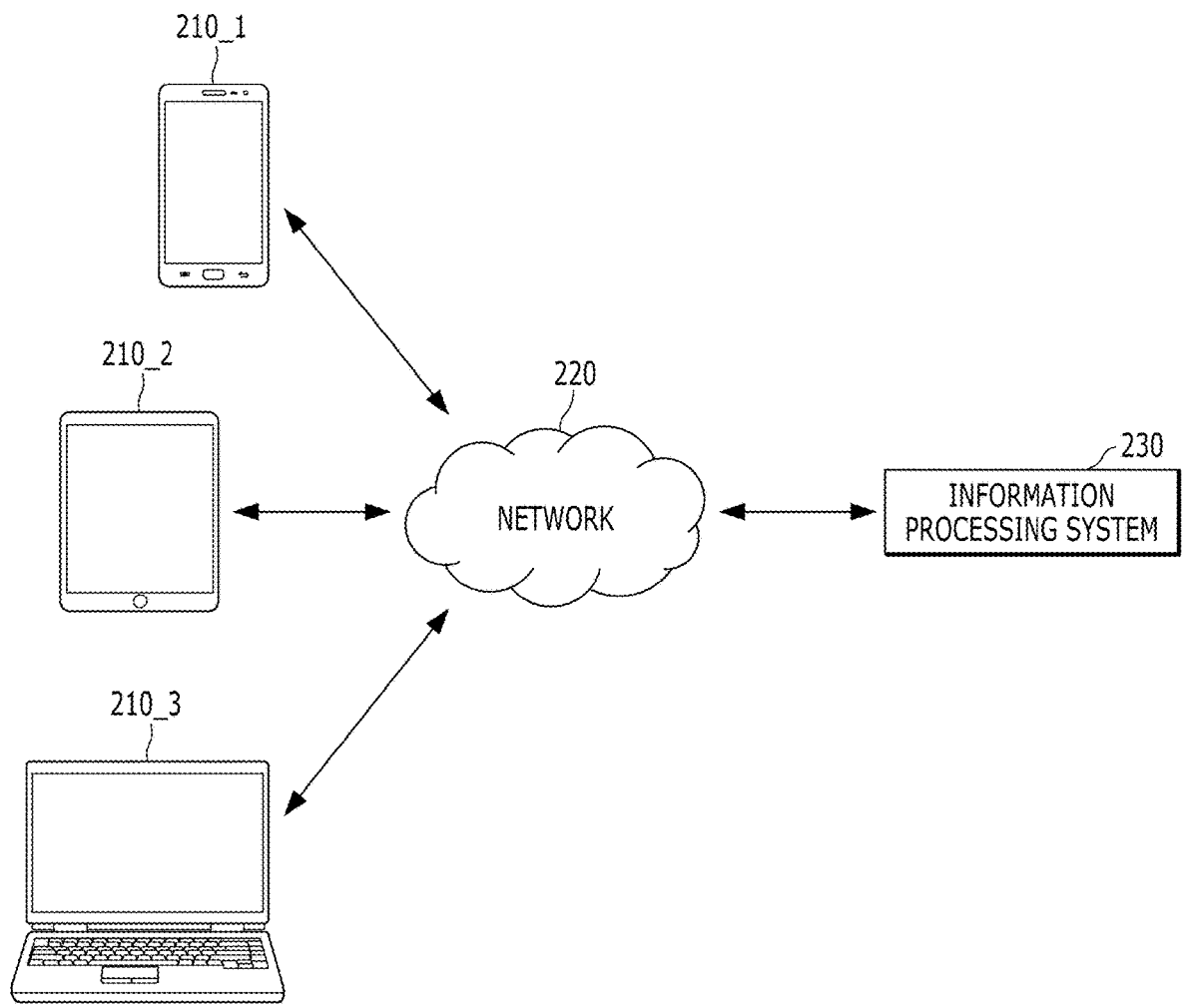
FIG. 2 is a schematic diagram illustrating a configuration in which an information processing system is communicatively connected to a plurality of user terminals in order to provide relevance information between users according to an example embodiment.

FIG. 2 is a schematic diagram illustrating a configuration in which an information processing system 230 is communicatively connected to a plurality of user terminals 210_1, 210_2, 210_3 to provide relevance information between users, according to an example embodiment. The information processing system 230 may include a system capable of providing an instant messaging service including the relevance information between users through a network 220. According to an example embodiment, the information processing system 230 may include one or more server devices and/or databases, or one or more distributed computing devices and/or distributed databases based on cloud computing services that can store, provide and execute computer-executable programs (e.g., downloadable applications) and data related the instant messaging service and provision of relevance information between users. The instant messaging service provided by the information processing system 230 may be provided to the user through the instant messaging application installed in each of the plurality of user terminals 210_1, 210_2, 210_3. For example, the instant messaging service may include a text messaging service, a video call service, a voice call service, a video streaming service, a service for providing relevance information between users, and the like between users of the instant messaging application.

The plurality of user terminals 210_1, 210_2, 210_3 may communicate with the information processing system 230 through the network 220. The network 220 may be configured to enable communication between the plurality of user terminals 210_1, 210_2, 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between user terminals 210_1, 210_2, 210_3, but example embodiments are not limited thereto.

In FIG. 2, a mobile phone terminal 210_1, a tablet terminal 210_2, and a PC terminal 210_3 are illustrated as the examples of the user terminals, but example embodiments are not limited thereto, and the user terminals 210_1, 210_2, 210_3 may be any computing device that is capable of wired and/or wireless communication and that can be installed with the instant messaging application and execute the same. For example, the user terminal may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. Further, FIG. 2 shows that three user terminals 210_1, 210_2, 210_3 are in communication with the information processing system 230 through the network 220, but example embodiments are not limited thereto, and a different number of user terminals may be configured to be in communication with the information processing system 230 through the network 220.

According to an example embodiment, the information processing system 230 may extract the relevance information between user accounts (or users) associated with the user terminals 210_1, 210_2, 210_3 through an instant messaging application operating on the user terminals 210_1, 210_2, 210_3, and provide the extracted result to the user terminals 210_1, 210_2, 210_3. The relevance information between users may include relation information between users and interaction information between users. According to another embodiment, the user terminals 210_1, 210_2, 210_3 may generate relevance information between user accounts (or users) of the instant messaging application and provide the generated result to the user. According to another embodiment, the information processing system 230 and the user terminals 210_1, 210_2, 210_3 may each generate a part of the relevance information between users. For example, the information processing system 230 may generate relation information between users, and the user terminals 210_1, 210_2, 210_3 may generate interaction information between users.

Figure 3:
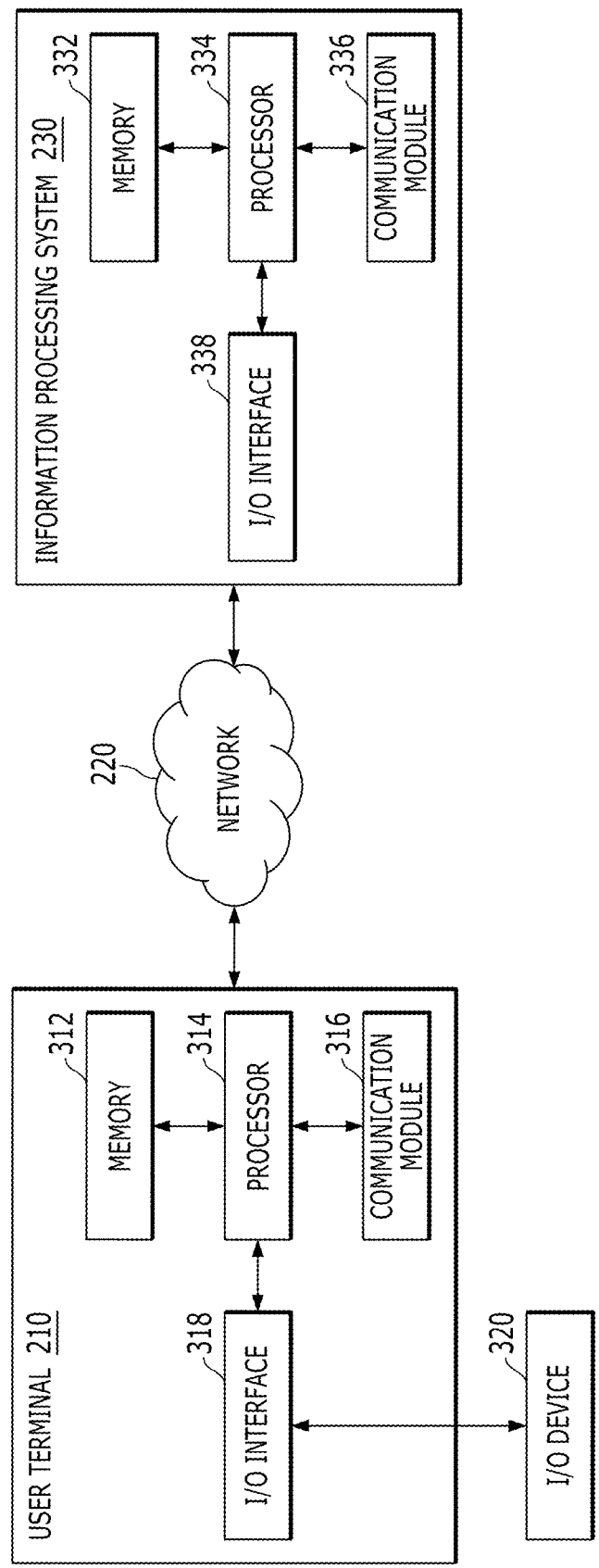
FIG. 3 is a block diagram illustrating an internal configuration of the user terminal and the information processing system according to an example embodiment.

FIG. 3 is a block diagram illustrating an internal configuration of the user terminal 210 and the information processing system 230 according to an example embodiment. The user terminal 210 may refer to any computing device that is capable of executing the instant messaging application and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316, 336. Further, an input and output device 320 may be configured to input information and/or data to the user terminal 210 or to output information and/or data generated from the user terminal 210 through the input and output interface 318.

The memories 312, 332 may include any non-transitory computer-readable recording medium. According to an example embodiment, the memories 312, 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. Further, an operating system and one or more program codes (e.g., a code for the instant messaging application, and the like installed and driven in the user terminal 210) may be stored in the memories 312, 332.

These software components may be loaded from a computer-readable recording medium separate from the memories 312, 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312, 332 through the communication modules 316, 336 rather than the computer-readable recording medium. For example, one or more programs may be loaded into the memories 312, 332 based on a computer program (e.g., an application that provides instant messaging services) installed by files provided by the developers or a file distribution system for distributing an installation file of the application through the network 220.

The processors 314, 334 may be configured to process the instructions of the computer program by performing basic arithmetic, logic, and input and output operations. The instructions may be provided to the processors 314, 334 from the memories 312, 332 or the communication modules 316, 336. For example, the processors 314, 334 may be configured to execute the received instructions according to program code stored in a recording device such as the memories 312, 332.

The communication modules 316, 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request for relevance information between a first user account and a second user account associated with the user terminal 210) generated by the processor 314 of the user terminal 210 according to the program code stored in the recording device such as the memory 312 or the like may be sent to the information processing system 230 through the network 220 under the control of the communication module 316. Conversely, a control signal or instructions provided under the control of the processor 334 of the information processing system 230 may be received by the user terminal 210 through the communication module 316 of the user terminal 210 via the communication module 336 and the network 220. For example, the user terminal 210 may receive relevance information between users, profile authentication information, profile change information, access country information, and the like, which is related to a user account associated with another user terminal, from the information processing system 230 through the communication module 316.

The input and output interface 318 may be a means for interfacing with the input and output device 320. As an example, the input device may include a device such as a camera, a keyboard, a microphone, a mouse, and so on, which includes an audio sensor and/or an image sensor, and the output device may include a device such as a display, a speaker, a haptic feedback device, and so on. As another example, the input and output interface 318 may be a means for interfacing with a device, such as, for example, a touch screen or the like that integrates a configuration or function for performing inputting and outputting. For example, when the processor 314 of the user terminal 210 processes the instructions of the computer program loaded in the memory 312, a service screen, relevance information between users or the like, which is configured with the information and/or data provided by the information processing system 230 or other user terminals, may be displayed on the display through the input and output interface 318. While FIG. 3 illustrates that the input and output device 320 is not included in the user terminal 210, example embodiments are not limited thereto, and the input and output device 320 may be configured as one device with the user terminal 210. Further, the input and output interface 338 of the information processing system 230 may be a means for interfacing with a device (not illustrated) for inputting or outputting, which may be connected to the information processing system 230 or included in the information processing system 230. In FIG. 3, the input and output interfaces 318, 338 are illustrated as the components configured separately from the processors 314, 334, but example embodiments are not limited thereto, and the input and output interfaces 318, 338 may be configured to be included in the processors 314, 334.

The user terminal 210 and the information processing system 230 may include more components than the components illustrated in FIG. 3. Meanwhile, it would be unnecessary to exactly illustrate most of the related components. According to an example embodiment, the user terminal 210 may be implemented to include at least a part of the input and output devices 320 described above. Further, the user terminal 210 may further include other components such as a transceiver, a global positioning system (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a camera module, various physical buttons, buttons using a touch panel, input and output ports, a vibrator for vibration, and so on are further included in the user terminal 210.

According to an example embodiment, the processor 314 of the user terminal 210 may be configured to operate an instant messaging application or a web browser application providing the instant messaging service including a service that provides relevance information between users. In this case, the program code associated with the corresponding application may be loaded into the memory 312 of the user terminal 210. While the application is running, the processor 314 of the user terminal 210 may receive information and/or data provided from the input and output device 320 through the input and output interface 318 or receive the information and/or data from the information processing system 230 through the communication module 316, and process the received information and/or data and store it in the memory 312. Further, such information and/or data may be provided to the information processing system 230 through the communication module 316.

While the instant messaging application is running, the processor 314 may receive text, image, video, and the like input or selected through the input device such as a camera, a microphone, and the like that includes a touch screen, a keyboard, an audio sensor and/or an image sensor connected to the input and output interface 318, and store the received text, image, and/or video or the like in the memory 312, or provide it to the information processing system 230 through the communication module 316 and the network 220. According to an example embodiment, the processor 314 may receive a request for relevance information between users through an input device, and provide the request to the information processing system 230 through the network 220 and the communication module 316.

The processor 334 of the information processing system 230 may be configured to manage, process, and/or store the information and/or data received from a plurality of user terminals and/or a plurality of external systems. According to an example embodiment, the processor 334 may extract/generate relevance information between a user account associated with the user terminal 210 and another user account based on the request for relevance information between users received from the user terminal 210. Additionally or alternatively, the processor 344 may determine whether or not another user account has changed the profile image recently (e.g., within a week), whether or not the profile image of another user account is a photograph of the user himself/herself, information on the access country of another user account, and the like.

Figure 4:
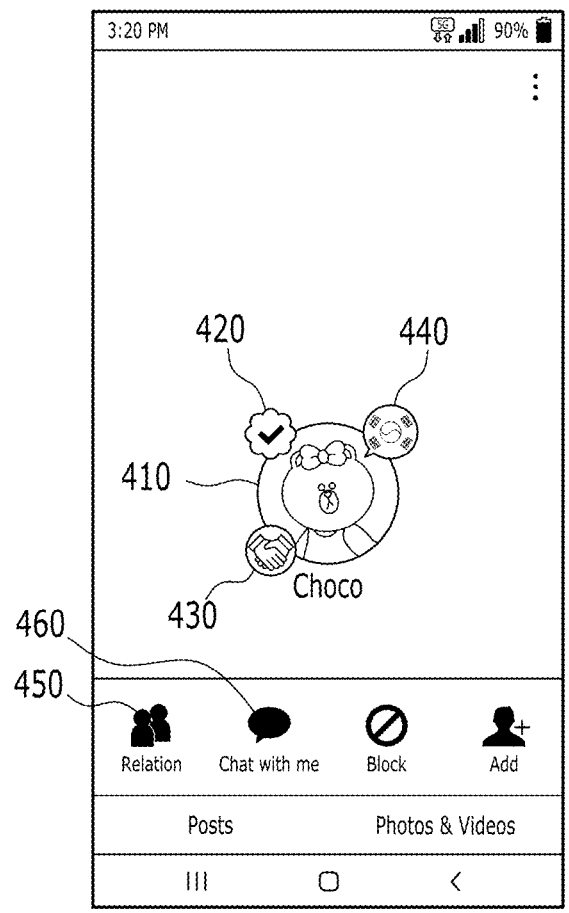
FIG. 4 is a diagram illustrating an example in which profile information of a user is displayed on an instant messaging application according to an example embodiment.

FIG. 4 is a diagram illustrating an example in which the profile information of the user is displayed on the instant messaging application according to an example embodiment. According to an example embodiment, when the first user (or the first user account) selects the profile image of the second user (or the second user account) displayed through a chat room (e.g., 1:1 chat room, group chat room, 1:N chat room, and the like) interface by a touch input or the like, the profile information (or profile page, profile interface) of the second user (e.g., Choco) may be displayed on the display. According to another example embodiment, when the first user selects the profile image of the second user displayed in a friend list or a recommended friend list by a touch input or the like, the profile information of the second user may be displayed on the display.

As illustrated, the profile information may include a profile image 410 and the user name ("Choco") which are the information set by the second user. Further, the profile information may include information customized for the first user and provided. For example, for the customized information of the first user, at least one of an authentication icon 420, an acquaintance icon 430, an access country icon 440, a relation information request icon 450, or an interaction information request icon 460 may be provided. Further, the profile information may include an icon (not illustrated) indicating that the second user ("Choco") has changed the profile image 410 recently (e.g., within one week).

The authentication icon 420 may indicate that the profile image 410 of the second user ("Choco") is an image obtained by capturing the face of the second user ("Choco"). For example, the information processing system (e.g., one or more processors of the information processing system) may recognize the face of the second user ("Choco") from the image (e.g., a selfie image) captured by the second user ("Choco") in the past. For example, the information processing system may receive a selfie image captured by the second user ("Choco") using an in-app camera of the instant messaging application, and recognize the face of the second user. In this case, when it is determined that the face of the second user ("Choco") is included in the profile image 410, the information processing system may cause the authentication icon 420, which indicates that the profile image 410 is an image obtained by capturing the face of the second user ("Choco"), to be displayed along with the profile image 410 on the display. For example, the authentication icon 420 may be displayed on an upper left area of the profile image 410 of the second user ("Choco"). According to another example embodiment, when the second user ("Choco") captures a selfie image using an in-app camera of the instant messaging application and uses it as the profile image 410, the information processing system may cause the authentication icon 420 to be displayed along with the profile image 410 on the display.

The acquaintance icon 430 may indicate that the second user ("Choco") is an acquaintance of the first user. For example, the processor (e.g., one or more processors of the information processing system or one or more processors of the user terminal) may determine whether or not there is an image including the face of the second user ("Choco") among the images associated with the first user (a profile image of the first user, an image stored in the user terminal of the first user, an image captured by the first user using the in-app camera of the instant messaging application, and the like). In response to determining that the face of the second user ("Choco") is included in the image associated with the first user, the processor may display the acquaintance icon 430 along with the profile image 410 on the display. According to another example embodiment, when there are more than a predetermined or threshold number of images including the face of the second user ("Choco") among the images associated with the first user, the processor may display the acquaintance icon 430 along with the profile image 410 on the display. For example, the acquaintance icon 430 may be displayed on a lower left area of the profile image 410 of the second user ("Choco").

The access country icon 440 may indicate from which country the second user ("Choco") has logged in to the instant messaging application. As illustrated, the access country icon 440 may be an icon that briefly represents the flag of the access country, and may be displayed on an upper right area of the profile image 410. According to an example embodiment, the information processing system may check the access country information using IP information, location information (e.g., GPS information), and the like of the user terminal associated with the second user ("Choco"). FIG. 4 illustrates that a flag-shaped access country icon 440 is displayed along with the profile image 410 as the access country information of the second user ("Choco"), but example embodiments are not limited thereto, and the access country information may be provided in various forms. For example, instead of the access country icon 440, an access country name, an access country code, and the like may be displayed in text form along with the profile image 410.

According to an example embodiment, the relation information request icon 450 and the interaction information request icon 460 may be displayed on the display along with the profile information. When the first user selects the relation information request icon 450 by a touch input or the like, the relation information between the first user and the second user ("Choco") may be displayed on the display. For example, information on a chat room that includes both the first user and the second user ("Choco") together, information on a mutual friend of the first user and the second user ("Choco"), and the like may be used as the relation information.

When the first user selects the interaction information request icon 460 by a touch input or the like, the interaction information between the first user and the second user ("Choco") may be displayed on the display. For example, information on a conversation between a first user and the second user ("Choco"), a mention message in which the first user mentions the second user ("Choco"), and a mention message in which the second user ("Choco") mentions the first user, and the like may be used as the interaction information.

FIG. 4 illustrates that the first user clicks each of the relation information request icon 450 and the interaction information request icon 460 to check the relation information and the interaction information, but example embodiments are not limited thereto. For example, it is also possible to configure such that the relevance information request icon may be displayed along with the profile information on the display and the first user may select the relevance information request icon by a touch input or the like to check both the relation information and the interaction information. With the configuration described above, even when the second user ("Choco") is a non-friend on the instant messaging application, the first user can easily check the access country of the second user ("Choco"), whether or not the profile image 410 is the real face of the second user ("Choco"), the relation information and the interaction information with the second user ("Choco"), and the like at once.

Figure 5:
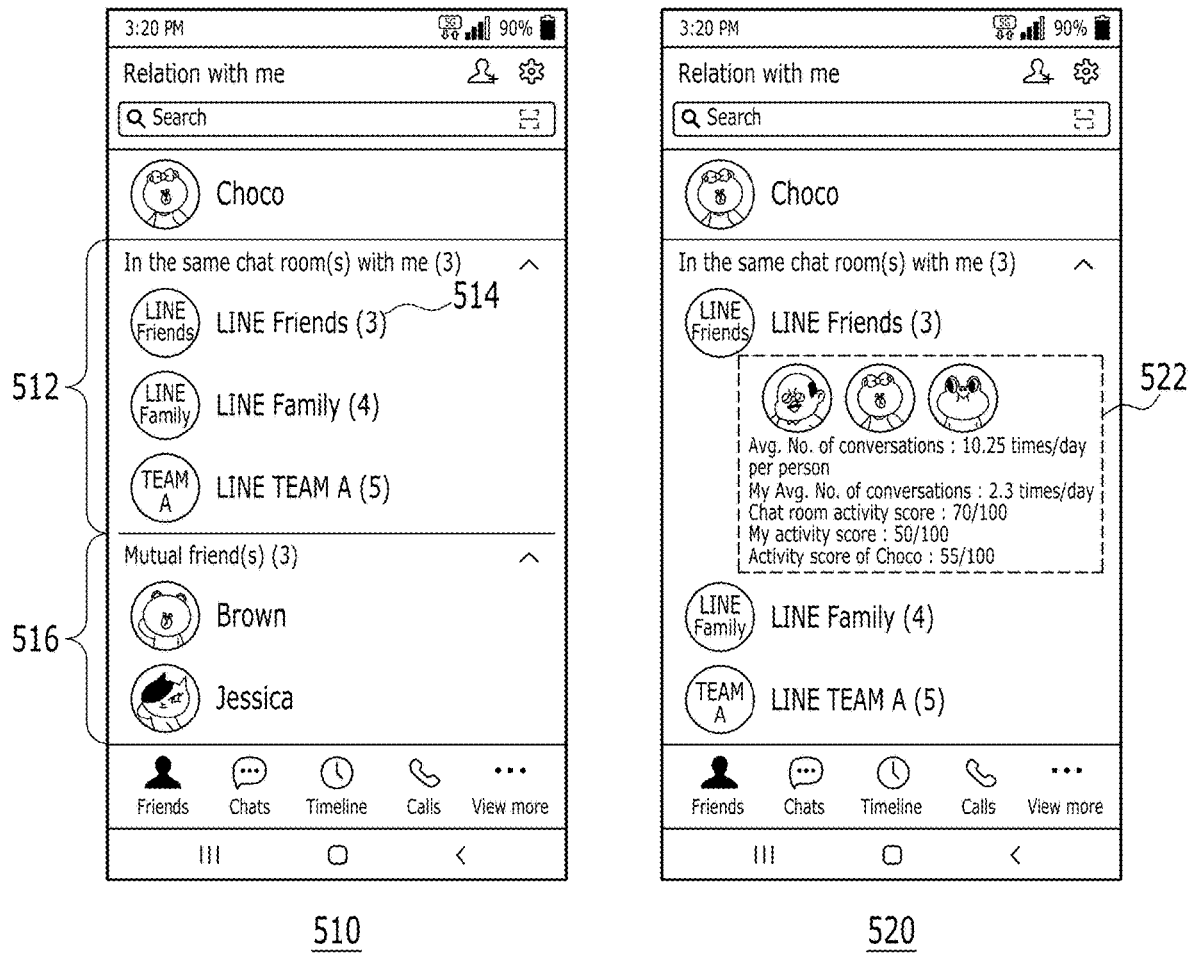
FIG. 5 is a diagram illustrating an example in which relation information between a first user and a second user is provided according to an example embodiment.

FIG. 5 is a diagram illustrating an example in which the relation information between the first user and the second user is provided according to an example embodiment. For example, the first user ("Boss") may select the relation information request icon (e.g., 450 in FIG. 4) displayed along with the profile information of the second user ("Choco") by a touch input or the like to check the relation information between the first user ("Boss") and the second user ("Choco") The first user ("Boss") may check statistical information of the LINE Friends chat room that includes both the first user himself/herself and the second user ("Choco") together, through first operation 510 and second operation 520.

The first operation 510 shows that information 512 on the chat room that includes both the first user ("Boss") and the second user ("Choco") together, and information 516 about a user who is a mutual friend of the first user ("Boss") and the second user ("Choco") are provided as the relation information between the first user ("Boss") and the second user ("Choco"), in response to the first user ("Boss") selecting the relation information request icon. According to an example embodiment, a profile image, a group name, a number of participants, and the like of each chat room may be included in the information 512 on the chat room that includes both the first user ("Boss") and the second user ("Choco") together. Further, the profile image, the user name, and the like of each mutual friend may be included in the information 516 on a user who is a mutual friend of the first user ("Boss") and the second user ("Choco").

Additionally or alternatively, information on each mutual friend may be provided in the form of a social graph between the first user ("Boss") and the second user ("Choco"). As illustrated, the first user ("Boss") and the second user ("Choco") may be included together in three chat rooms (LINE Friends chat room, LINE Family chat room, and LINE TEAM A chat room), and may have three mutual friends (including "Brown" and "Jessica"). When there are many chat rooms and many mutual friends, the first user can check the entire details by using a scroll input or the like.

The second operation 520 shows that detailed information 522 for the LINE Friends chat room is provided in response to the first user ("Boss") selecting an area 514 of the LINE Friends chat room by a touch input or the like in order to check the information on the LINE Friends chat room, which is a group chat room, among chat rooms that includes the first user ("Boss") himself/herself and the second user ("Choco") together. According to an example embodiment, the detailed information 522 on the LINE Friends chat room includes statistical information such as profile images of participants, an average number of messages input per person per day in the group chat room by the participants, an average number of messages input per day in the group chat room by the first user ("Boss"), an average number of messages input per day in the group chat room by the second user ("Choco"), an activity score of the group chat room, an activity score of the first user ("Boss") in the group chat room, an activity score of the second user ("Choco") in the group chat room, and the like. For example, the activity score of the group chat room may be calculated based on a total number of messages in the group chat room, the average number of messages input per day by users included in the group chat room, a difference between the number of messages sent by the user who sent the most messages and the number of messages sent by the user who sent the least message in the group chat room, the number of materials (e.g., voice messages, images, videos, files, contacts, and/or web links) other than the messages sent to the corresponding group chat room, the time the message is mainly sent in the group chat room, and the like.

The activity score of the first user (Boss; me) in the group chat room may be calculated based on at least one of a ratio of the number of messages of the first user ("Boss") in the selected group chat room to the total number of messages in the selected group chat room, a ratio of the number of messages of the first user ("Boss") in the selected group chat room to the total number of messages of the first user ("Boss") in all chat rooms that include the first user ("Boss"), or the number of users included in the selected chat room. For example, the activity score of the first user ("Boss") in the group chat room may be calculated by the following equation.

$$\frac{\text{Number of my messages in chat room}}{\text{Total number of messages in chat room}} \times$$

$$\frac{\text{Number of my messages in chat room}}{\text{Sum of number of my messages in all chat rooms}} \times$$

$$\text{Number of people in selected chat room}^2$$

The activity score of the second user ("Choco") in the group chat room may be calculated in the same manner as the activity score of the first user ("Boss") in the group chat room.

FIG. 5 illustrates that, when one (LINE Friends group chat room) of the chat rooms that includes the first user ("Boss") and the second user ("Choco") together is selected, the information on the selected chat room is displayed on the display, but example embodiments are not limited thereto. For example, in response to a user selecting the relation information request icon (e.g., 450 in FIG. 4) by a touch input or the like, detailed information on all the chat rooms that include both the first user ("Boss") and the second user ("Choco") may be provided. With the configuration described above, the user can easily check the relation with another user (a chat room to which they belong, a person who is a mutual friend, and the like).

Figure 6:
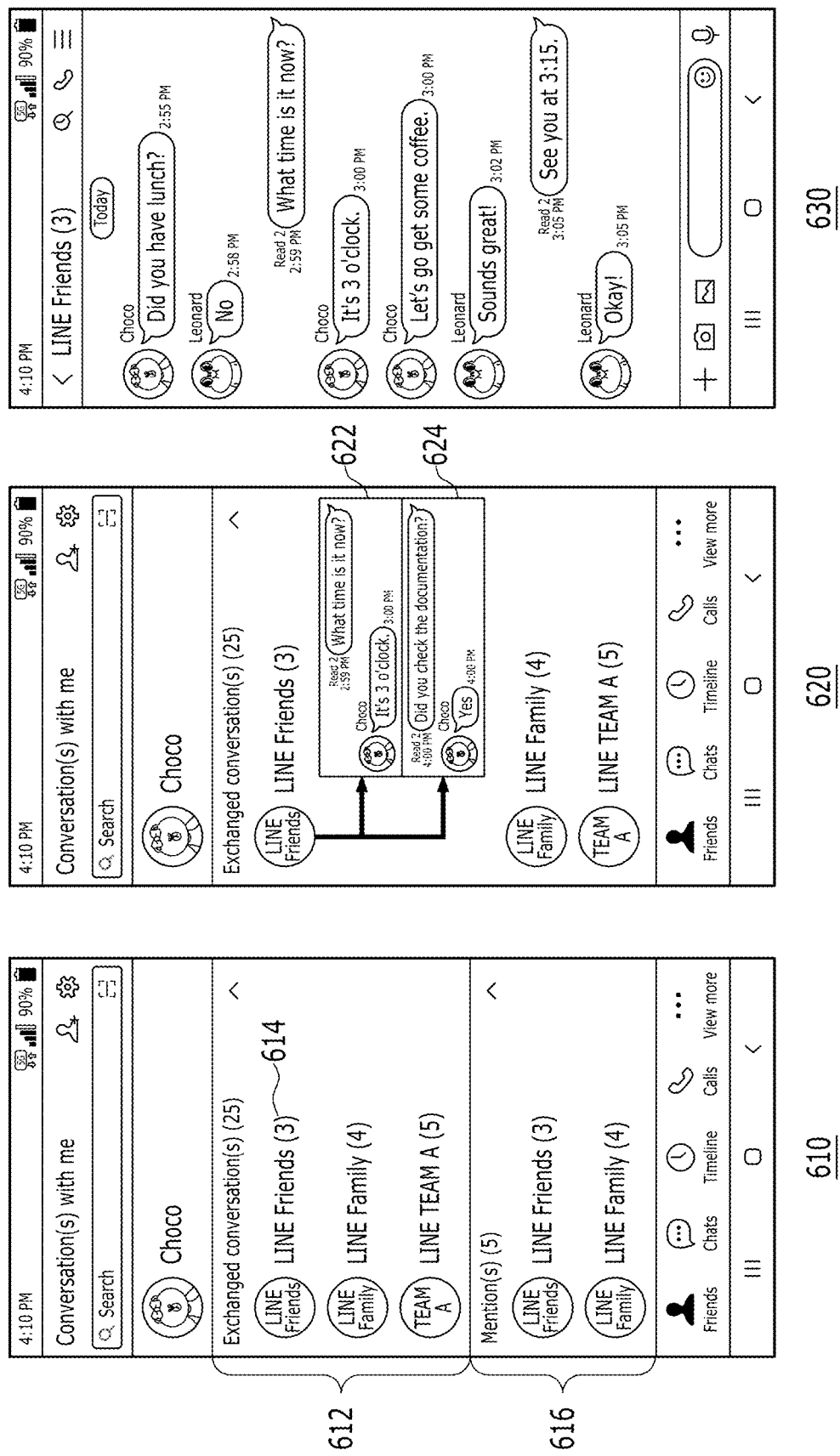
FIG. 6 is a diagram illustrating an example in which past conversation details between a first user and a second user are provided as interaction information according to an example embodiment.

FIG. 6 is a diagram illustrating an example in which past conversation details between the first user and the second user are provided as the interaction information according to an example embodiment. For example, the first user ("Boss") may select the interaction information request icon (e.g., 460 in FIG. 4) displayed along with the profile information of the second user ("Choco") by a touch input or the like to check the interaction information between the first user ("Boss") and the second user ("Choco"). The first user ("Boss") may check the content of a conversation exchanged with the second user ("Choco") in the past through first operation 610, second operation 620, and third operation 630.

The first operation 610 shows that information 612 on the chat room in which the first user ("Boss") had a conversation with the second user ("Choco") and information 616 on the chat room in which the first user ("Boss") and the second user ("Choco") input a mention message mentioning each other are provided as the interaction information between the first user ("Boss") and the second user ("Choco"), in response to the first user ("Boss") selecting the interaction information request icon associated with the second user ("Choco"). According to an example embodiment, a profile image, a group name, the number of participants, and the like of each chat room may be included in the information 612 on the chat room in which the first user ("Boss") had a conversation with the second user ("Choco"). For example, the first user ("Boss") and the second user ("Choco") may have had a conversation in three chat rooms (LINE Friends chat room, LINE Family chat room, and LINE TEAM A chat room). Further, the number of messages (e.g., 25 messages) in a conversation between the first user ("Boss") and the second user ("Choco") may be provided along with the information 612 on the chat room where the first user ("Boss") had the conversation with the second user ("Choco").

According to an example embodiment, a profile image, a group name, a number of participants, and the like of each chat room may be included in the information 616 on the chat room where the first user ("Boss") and the second user ("Choco") input a mention message mentioning each other. For example, the first user ("Boss") and the second user ("Choco") may have input a mention message mentioning each other in two chat rooms (LINE Friends chat room and LINE Family chat room). Further, the number of mention messages (e.g., 5 mention messages) input by the first user ("Boss") and the second user ("Choco") mentioning each other may be provided along with the information 616 on the chat room where the first user ("Boss") and the second user ("Choco") input the mention message mentioning each other. When there is a large amount of information 612 on the chat room where the first user ("Boss") had a conversation with the second user ("Choco"), and of information 616 on the chat room where the first user ("Boss") and the second user ("Choco") input mention messages mentioning each other, the first user ("Boss") can check the entire details by using a scroll input or the like.

The second operation 620 shows that the conversations 622, 624 between the first user ("Boss") and the second user ("Choco") in the LINE Friends chat room are displayed on the display in response to the first user ("Boss") selecting a LINE Friends chat room area 614 by a touch input or the like in order to check the content of the conversation with the second user ("Choco") in the LINE Friends group chat room. For example, in the LINE Friends chat room, a message "What time is it now?" input by the first user ("Boss") and a message "It's 3 o'clock" input by the second user ("Choco") may be displayed on the display as the first conversation 622, and a message "Did you check the document?" input by the first user ("Boss") and a message "yes" input by the second user ("Choco") may be displayed on the display as the second conversation 624.

According to an example embodiment, in order to provide the information 612 on chat room where the first user ("Boss") had a conversation with the second user ("Choco") and also to provide the conversations 622, 624 between the first user ("Boss") and the second user ("Choco"), one or more processors of the user terminal (e.g., 210 in FIG. 3) or the information processing system (e.g., 230 in FIG. 3) may collect message information in the group chat room that includes the first user ("Boss") and the second user ("Choco") together, and extract the conversations 622, 624 between the first user ("Boss") and the second user ("Choco") from among the collected message information. For example, the processor may calculate a correlation score between the first message (e.g., "What time is it now?") of the first user ("Boss") and the second message (e.g., "It's 3 o'clock.") of the second user ("Choco") using a desired (or alternatively, pre-stored) language model. In this case, in response to determining that the calculated correlation score is equal to or greater than a predetermined or threshold value, the processor may extract a pair of the first message and the second message (e.g., "What time is it now?" and "It's 3 o'clock.") as the first conversation 622 between the first user ("Boss") and the second user ("Choco").

In this example, the language model may be a Next Sentence Prediction model based on Bidirectional Encoder Representations from Transformers (BERT). For example, the Next Sentence prediction model may be an artificial neural network model obtained by a machine trained with pairs of sentences. When the first message and the second message are input, the Next Sentence prediction model may calculate a probability that the second message is a next sentence of the first message. In consideration of a privacy issue, when messages exchanged by the instant messaging service subscribers are encrypted and stored on the information processing system, the conversations 622, 624 between the first user ("Boss") and the second user ("Choco") may be extracted from the message data stored by the user terminal (the user terminal used by Boss) itself. By using the Next Sentence prediction model, it is possible to quickly extract a conversation between specific users with high accuracy among many messages in the group chat room.

The third operation 630 shows that the first user ("Boss") moves to the location of the first conversation 622 in the LINE Friends chat room in response to selecting the first conversation 622 by a touch input or the like. For example, the LINE Friends chat room may be displayed on the display such that the first conversation 622 is automatically scrolled to be displayed in the center of the screen. The first user ("Boss") may check the entire content of the conversation exchanged with the second user ("Choco") in the past through the messages before and after the first conversation 622 displayed on the screen. With this configuration, the first user ("Boss") can easily check whether or not the first user had a conversation with the second user ("Choco") in the past, information on the chat room in which the conversation was held, when the conversation was held, and the like, by a simple touch input or the like.

FIG. 6 illustrates that conversations 622, 624 between the first user ("Boss") and the second user ("Choco") included in the chat room are displayed on the display in response to the first user ("Boss") selecting one chat room (LINE Friends group chat room) among the information 612 about the chat room where the first user had a conversation with the second user ("Choco"), but example embodiments are not limited thereto. For example, in response to the first user ("Boss") selecting the interaction information request icon (e.g., 460 in FIG. 4) associated with the second user ("Choco") through a touch input or the like, the information on all chat rooms where the first user ("Boss") and the second user ("Choco") had a conversation with, and the content of the conversation included in each chat room may be displayed on the display.

Figure 7:
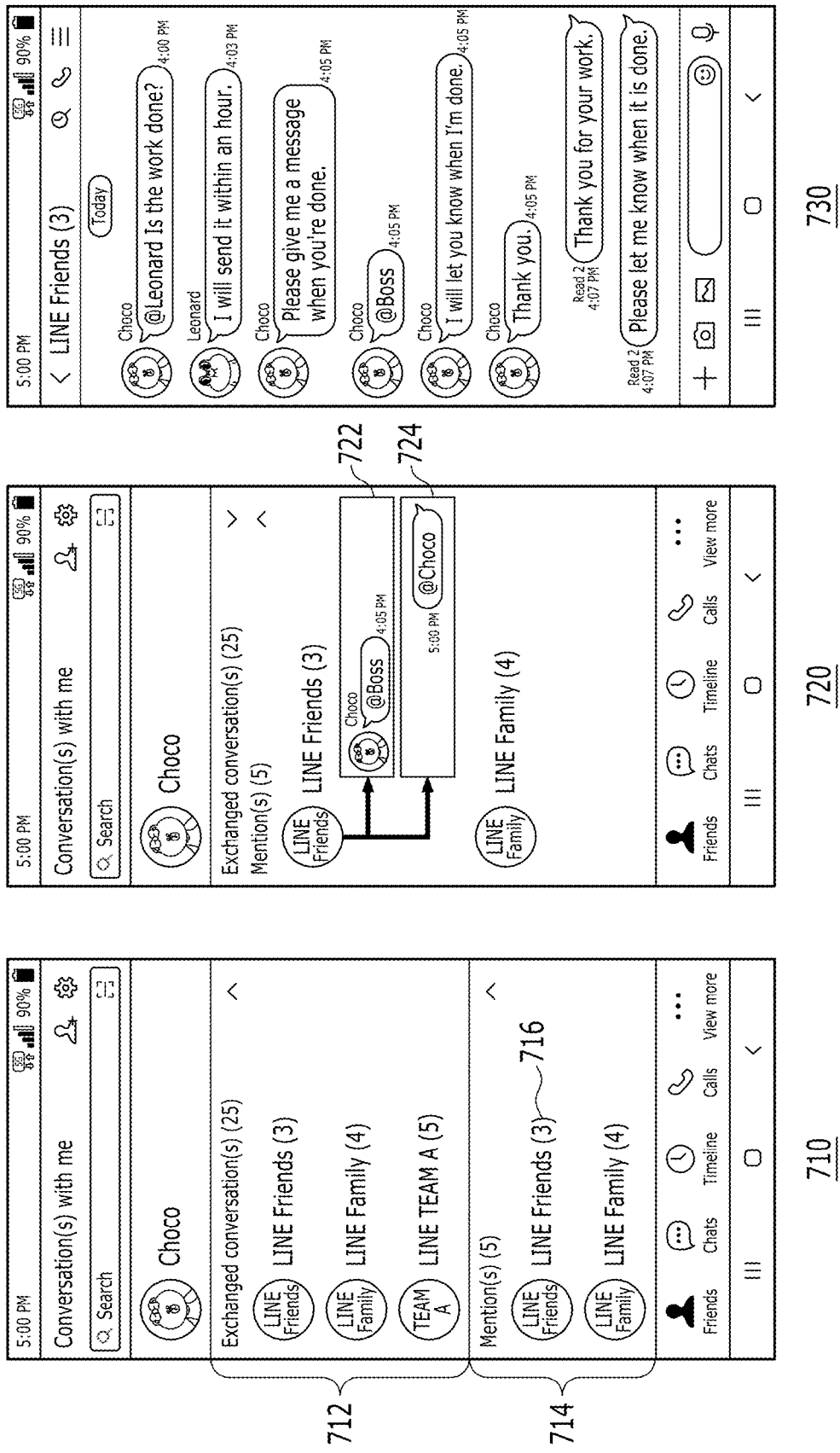
FIG. 7 is a diagram illustrating an example in which mention messages in which a first user and a second user mention each other are provided as interaction information according to an example embodiment.

FIG. 7 is a diagram illustrating an example in which mention messages 722, 724 by the first user and the second user mentioning each other are provided as the interaction information according to an example embodiment. For example, the first user ("Boss") may select the interaction information request icon (e.g., 460 in FIG. 4) displayed along with the profile information of the second user ("Choco") by a touch input or the like to check the interaction information between the first user ("Boss") and the second user ("Choco") The first user ("Boss") can check the content of mention messages 722, 724 input by the first user ("Boss") and the second user ("Choco") mentioning each other through the first operation 710, the second operation 720, and the third operation 730. The mention message may be a message combining a tag (e.g., @) and the name of a user subscribed to the instant messaging application to mention the corresponding user.

The first operation 710 shows that information 712 on the chat room in which the first user ("Boss") had a conversation with the second user ("Choco") and information 714 on the chat room in which the first user ("Boss") and the second user ("Choco") input a mention message mentioning each other are provided as the interaction information between the first user ("Boss") and the second user ("Choco"), in response to the first user ("Boss") selecting the interaction information request icon associated with the second user ("Choco"). According to an example embodiment, a profile image, a group name, a number of participants, and the like of each chat room may be included in the information 714 on the chat room where the first user ("Boss") and the second user ("Choco") input a mention message mentioning each other. For example, the first user ("Boss") and the second user ("Choco") may have input a mention message mentioning each other in two chat rooms (LINE Friends chat room and LINE Family chat room). Further, the number of mention messages (e.g., 5 mention messages) input by the first user ("Boss") and the second user ("Choco") mentioning each other may be provided along with the information 714 on the chat room where the first user ("Boss") and the second user ("Choco") input the mention message mentioning each other. When there is a large amount of information 712 on the chat room where the first user ("Boss") had a conversation with the second user ("Choco"), and of information 714 on the chat room where the first user ("Boss") and the second user ("Choco") input mention messages mentioning each other, the first user ("Boss") can check the entire details by using a scroll input or the like.

The second operation 720 shows that mention messages 722, 744 input by the first user ("Boss") and the second user ("Choco") mentioning each other in the LINE Friends chat room are displayed on the display in response to the first user ("Boss") selecting a LINE Friends chat room area 716 by a touch input or the like. For example, in a LINE Friends chat room, the mention message 722 in which the second user ("Choco") mentions the first user ("Boss"), and the mention message 724 in which the first user ("Boss") mentions the second user ("Choco") may be displayed on the display. According to an example embodiment, in order to provide the mention messages 722, 744 in which the first user ("Boss") and the second user ("Choco") mention each other, one or more processors of the user terminal (e.g., 210 in FIG. 3) or the information processing system (e.g., 230 in FIG. 3) may collect the message information in the group chat room where the first user ("Boss") and the second user ("Choco") are included together, and extract the mention message (@Choco) in which the first user ("Boss") mentions the second user ("Choco") and the mention message (@ Boss) in which the second user ("Choco") mentions the first user ("Boss") from the collected message information.

The third operation 730 shows that the first user ("Boss") moves to the location of the mention message 722 in the LINE Friends chat room in response to selecting the mention message 722 by a touch input or the like. For example, the LINE Friends chat room may be displayed on the display such that the mention message 722 is automatically scrolled to be displayed in the center of the screen. The first user ("Boss") may check the entire content of the conversation exchanged with the second user ("Choco") in the past through the messages before and after the mention message 722 is displayed on the screen. With this configuration, the first user ("Boss") can easily check whether or not there is a mention message in which the first user and the second user ("Choco") mention each other, information on a chat room that includes the mention message, the time when the mention message is sent, and the like, by a simple touch input or the like.

FIG. 7 illustrates that the mention messages 722, 724 included in the selected chat room are displayed on the display in response to selection of one chat room (LINE Friends group chat room) among the information 714 on the chat room where the first user ("Boss") and the second user ("Choco") input the mention message mentioning each other, but example embodiments are not limited thereto. For example, in response to the first user ("Boss") selecting the interaction information request icon (e.g., 460 in FIG. 4) associated with the second user ("Choco") by a touch input or the like, the information on all chat rooms that include the mention messages input by the first user ("Boss") and the second user ("Choco") mentioning each other and the mention messages included in each chat room may be displayed on the display.

Figure 8:
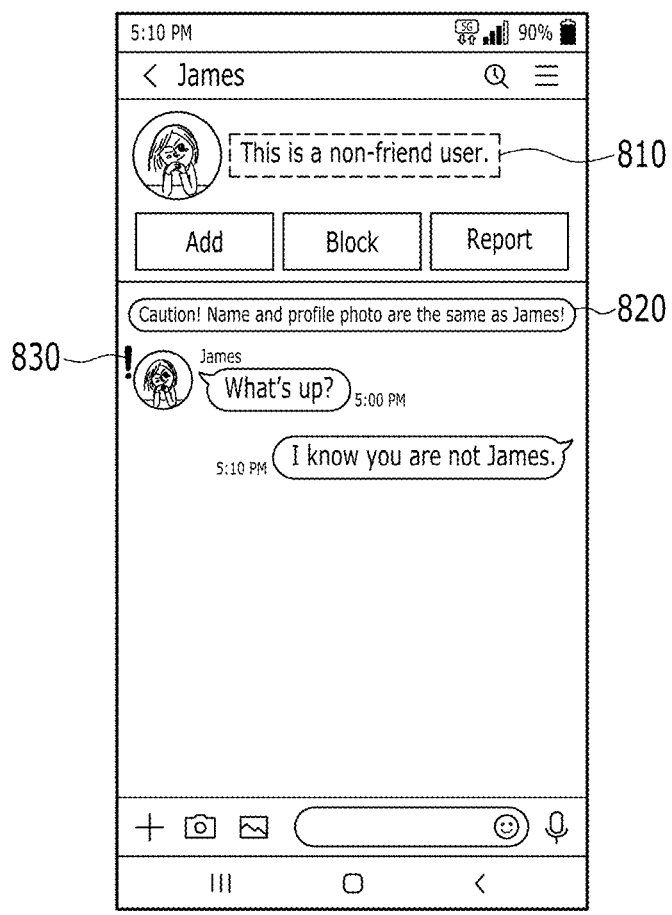
FIG. 8 is a diagram illustrating an example of displaying an impersonation warning against a user suspected of impersonating another user according to an example embodiment.

FIG. 8 is a diagram illustrating an example of displaying an impersonation warning against a user suspected of impersonating another user according to an example embodiment. According to an example embodiment, when the first user ("Boss") receives a message on the instant messaging application from a second user ("Edward") who is a non-friend, a message sent by the second user ("Edward") may be displayed on the display in a 1:1 chat room interface between the first user ("Boss") and the second user ("Edward"), along with a profile image of the second user ("Edward"), a message 810 "This is a non-friend user", and an "add" button, a "block" button, and a "report" button.

According to an example embodiment, in response to determining by one or more processors of the user terminal or the information processing system that the second user ("Edward") is impersonating a third user ("James"), an impersonation warning message 820 may be displayed. For example, as the impersonation warning message 820, a message such as "Caution! Name and profile photo are the same as James!" or the like may be displayed. Additionally or alternatively, an impersonation warning icon 830 may be displayed next to the profile image of the second user ("Edward"). When the second user ("Edward") who is a non-friend of the first user ("Boss") has the same or similar profile information (profile image, name, and the like) to the third user ("James") who is a friend of the first user ("Boss"), the processor may determine that the second user ("Edward") impersonates the third user ("James"). For example, the processor may calculate the similarity between the profile information of the third user ("James") who is a friend of the first user ("Boss") and the profile information of the second user ("Edward"), and when the calculated similarity is equal to or greater than a predetermined or threshold value, the processor may display the impersonation warning message 820 and the impersonation warning icon 830 on the display.

FIG. 8 illustrates that only the impersonation warning icon 830 is displayed on or near the profile image of the second user ("Edward"), but example embodiments are not limited thereto. For example, when the second user ("Edward") has changed the profile image recently (e.g., within a week), the profile change icon (e.g., 160 in FIG. 1) may be displayed along with the impersonation warning icon 830. Further, an access country icon indicating the access country of the second user ("Edward") (e.g., 180 in FIG. 1) may also be displayed along with the impersonation warning icon 830.

FIG. 8 illustrates that the impersonation warning message 820 and the impersonation warning icon 830 are displayed on the display when the second user ("Edward") is a non-friend of the first user ("Boss"), but example embodiments are not limited thereto. For example, even when the second user ("Edward") is a friend of the first user ("Boss"), when it is determined that the second user ("Edward") is impersonating a third user ("James") who is also a friend of the first user ("Boss"), the impersonation warning message 820 and the impersonation warning icon 830 may be displayed on the display.

With the configuration described above, the first user ("Boss") can easily check whether or not the second user ("Edward") who sent the message intentionally manipulates the profile image and name to impersonate the third user ("James") who is a friend of the first user.

Figure 9:
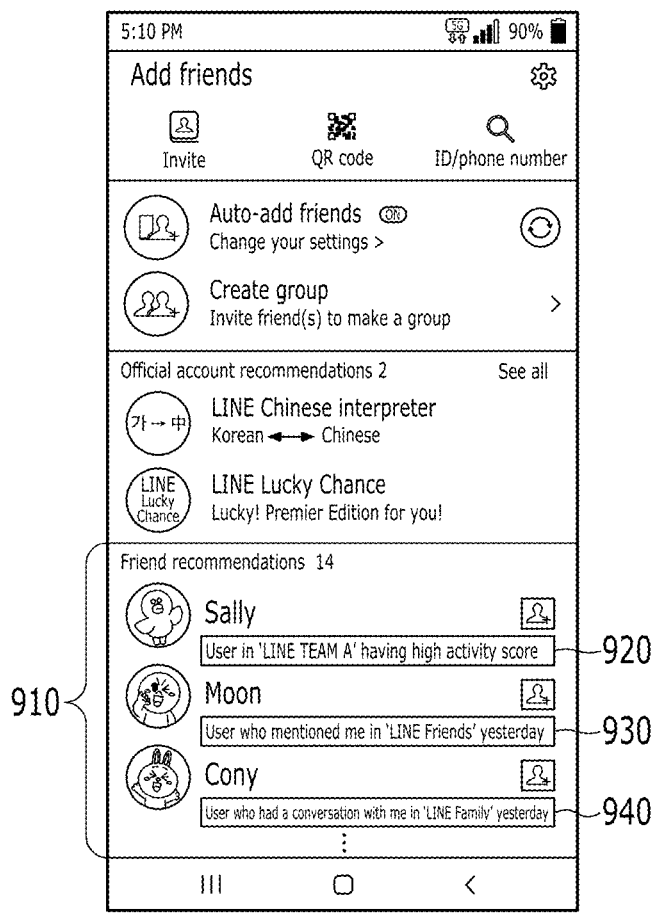
FIG. 9 is a diagram illustrating an example of providing a recommended friend list based on relevance information between users according to an example embodiment.

FIG. 9 is a diagram illustrating an example of providing a recommended friend list 910 based on relevance information between users according to an example embodiment. As illustrated, the recommended friend list 910 may be provided to recommend the users (e.g., "Sally", "Moon", "Cony") who are non-friends of the first user ("Boss") for friends on the instant messaging application. According to an example embodiment, the order of the recommended users displayed in the recommended friend list 910 may be determined based on the relevance information between users.

One or more processors of the user terminal (e.g., 210 in FIG. 3) or the information processing system (e.g., 230 in FIG. 3) may calculate an importance score of each recommended user based on the relevance information between the first user ("Boss") and the recommended users, and determine a priority to expose the recommended user in the recommended friend list 910 based on the calculated importance score. For example, the importance score of the recommended user may be calculated based on at least one of conversation between the first user ("Boss") and the recommended user, the activity score of the group chat room that includes the first user ("Boss") and the recommended user together, the number of chat rooms that include both the first user ("Boss") and the recommended user, social distance between the first user ("Boss") and the recommended user account, whether or not the profile image of the recommended user is an image obtained by capturing the recommended face of the user, whether or not the profile image of the recommended user includes the face of the first user ("Boss"), the number of images including the face of the recommended user among the images stored in the user terminal of the first user ("Boss"), the number of times the first user ("Boss") inputs a mention message mentioning the recommended user in the group chat room that includes the first user ("Boss") and the recommended user together, or the number of times the recommended user inputs a mention message mentioning the first user ("Boss") in the group chat room that includes the first user ("Boss") and the recommended user together. Further, the importance score of the recommended user may be calculated based on the number of users on the instant messaging application who are friends of the recommended user, the number of chat rooms that include the recommended user, and the like. The importance score of the recommended user may be calculated higher as the number of conversations with the first user ("Boss") increases, as the activity score of the group chat room that includes the first user ("Boss") together increases, as the number of chat rooms that include the first user ("Boss") together increases, as the social distance is closer, as the number of mention messages mentioning each other increases, as the number of users who are friends with the recommended user increases, and as the number of chat rooms that include the recommended user increases, and a higher importance score may be exposed closer to the top of the recommended friend list 910. For example, when a second user ("Sally"), a third user ("Moon"), and a fourth user ("Cony") have a higher importance score in this order, they may be displayed in the recommended friend list 910 in the order of the second user ("Sally"), the third user ("Moon"), and the fourth user ("Cony").

Although not illustrated, factors used for calculating the importance score (e.g., the conversation between the first user ("Boss") and the recommended user, the activity score of the group chat room that includes the first user ("Boss") and the recommended user together, the number of chat rooms that include both the first user ("Boss") and the recommended user, and the like) may be displayed along with the recommended friend list 910, and the user may customize weights for each factor.

According to an example embodiment, when calculating the importance score of the recommended user, information 920, 930, 940 related to an item of a highest weight for each recommended user may be displayed on the recommended friend list 910 along with profile information of the recommended user. For example, for the second user ("Sally"), a message 920 "User in 'LINE TEAM A' having high activity score" may be displayed, and for the third user ("Moon"), a message 930 "User who mentioned me in 'LINE Friends' yesterday" may be displayed, and for the fourth user ("Cony"), a message 940 "User who had a conversation with me in 'LINE Family' yesterday." may be displayed. For friend recommending, a recommendation ranking may be determined based on the relevance information between users, such that a user with a high probability that the first user ("Boss") would add as a friend may be displayed at the top of the recommended friend list 910. Further, the reason for recommending each recommended user may be displayed together in the recommended friend list 910, such that the first user ("Boss") may easily and quickly check the relevance between the first user himself/herself and the recommended user.

According to an example embodiment, the first user ("Boss") may select one of the recommended users displayed on the recommended friend list 910, and then select the relation information request icon (e.g., 450 in FIG. 4) on the profile information screen of the selected recommended user to check relation information between the first user ("Boss") and the recommended user. Further, the first user ("Boss") may select the interaction information request icon (e.g., 460 in FIG. 4) on the profile information screen of the selected recommended user to also check the interaction information between the first user ("Boss") and the recommended user.

Figure 10:
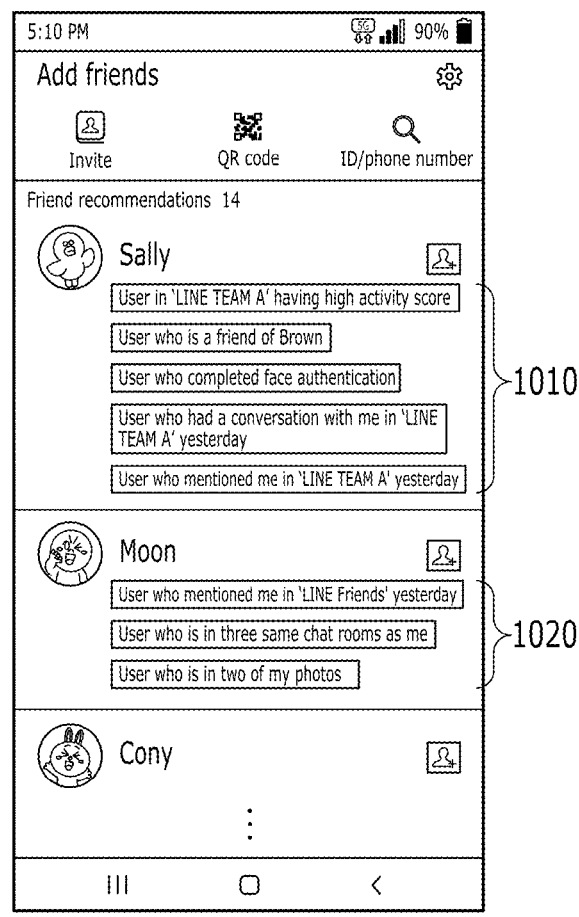
FIG. 10 is a diagram illustrating another example of providing a recommended friend list based on relevance information according to an example embodiment.

FIG. 10 is a diagram illustrating another example of providing the recommended friend list based on the relevance information according to an example embodiment. Unlike FIG. 9, in FIG. 10, information on all items reflected in the importance score of the recommended user is displayed along with the profile information of the recommended user in the recommended friend list. As illustrated, for the second user ("Sally"), relevance information 1010 such as "User from LINE TEAM A with high activity score", "User is a friend of Brown", "User face is authenticated", "User conversed with me in LINE TEAM A yesterday, "User mentioned me in LINE TEAM A yesterday", and the like may be displayed. Further, for the third user ("Moon"), the relevance information 1020 such as "User mentioned me in LINE Friends yesterday", "User is in the three same chat rooms as me", "User is in two of my photographs", and the like may be displayed.

FIG. 10 illustrates that information on all items reflected in the importance score of the recommended user is displayed on the recommended friend list, but example embodiments are not limited thereto. According to an example embodiment, among the items reflected in the importance score of the recommended user, the top N items may be displayed along with the profile information of the recommended user. Because the reason for recommending each recommended user is displayed in various ways together in the recommended friend list, it is possible to quickly check the relevance between the first user ("Boss") himself/herself and the recommended user, and to easily determine whether or not to add as a friend.

Figure 11:
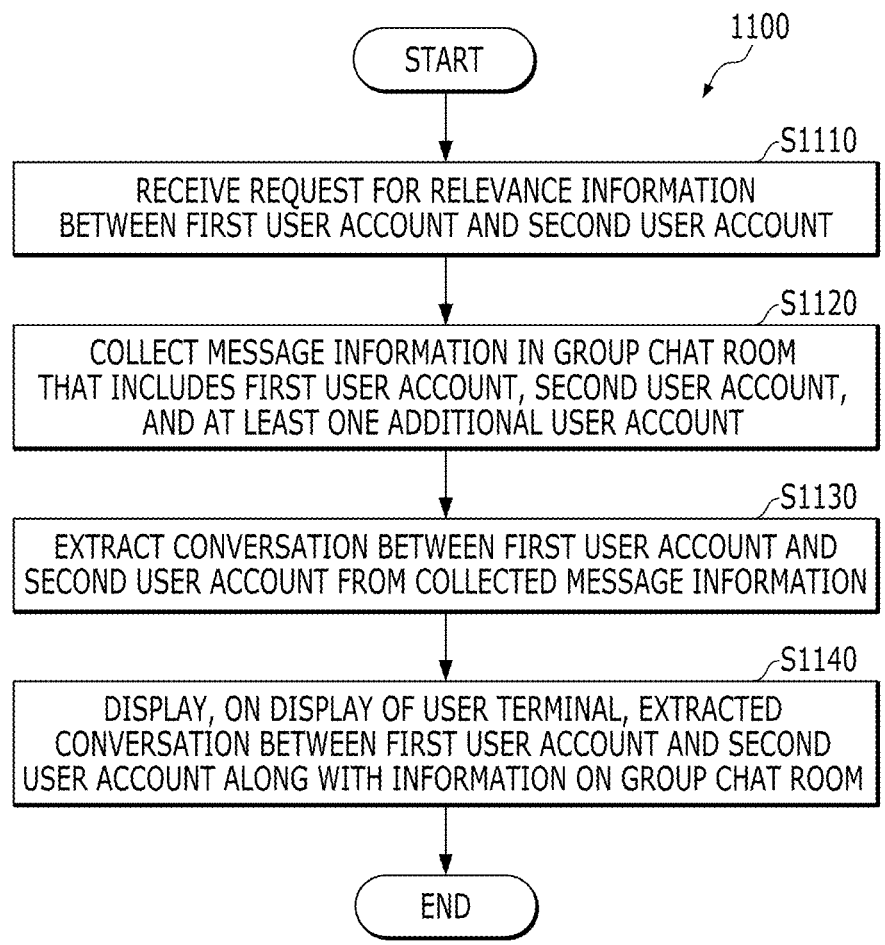
FIG. 11 is a flowchart illustrating a method for providing relevance information between users according to an example embodiment.

FIG. 11 is a flowchart illustrating a method 1100 for providing relevance information between users according to an example embodiment. According to an example embodiment, the method 1100 for providing relevance information between users may be performed by a user terminal (e.g., one or more processors of the user terminal). According to another example embodiment, the method 1100 for providing relevance information between users may be performed by an information processing system (e.g., one or more processors of the information processing system). According to another example embodiment, the user terminal and the information processing system may divide and perform the steps of the method 1100 for providing relevance information between users.

As illustrated, the method 1100 for providing relevance information between users may be initiated by a processor receiving a request for relevance information between the first user account and the second user account, at S1110. For example, the request for relevance information may be received from a user through a profile page of the second user account displayed on the display. According to an example embodiment, the relevance information may include the relation information, the interaction information, and the like between the first user account and the second user account. Additionally or alternatively, the relevance information may include activity information of the second user account, such as whether or not the second user account has recently changed the profile image, and user information of the second user account, such as whether or not the profile image of the second user account is his or her own face, access country information of the second user account, or the like.

The processor may collect message information in the group chat room that includes the first user account, the second user account, and at least one additional user accounts, at S1120. For example, the additional user accounts may be a user account who is a friend of the first user account and also a friend of the second user account, a user account who is a friend of the first user account and a non-friend of the second user account, a user account who is a non-friend of the first user account and is a friend of the second user account, a user account who is a non-friend of both the first user account and the second user account, and the like.

The processor may extract a conversation between the first user account and the second user account from the collected message information, at S1130. For example, the processor may calculate a correlation score between the first message of the first user account and the second message of the second user account using a desired (or alternatively, pre-stored) language model, and in response to determining that the calculated correlation score is equal to or greater than a desired (or alternatively, predetermined) first threshold, the processor may extract the first message and the second message as a conversation between the first user account and the second user account. In this case, the language model may be a Next Sentence Prediction model.

Thereafter, the processor may display the extracted conversation between the first user account and the second user account along with the information on the group chat room on the display of the user terminal, at S1140. According to an example embodiment, in response to receiving a selection from the user for the conversation displayed on the display, the processor may move to the location of the conversation in the group chat room and display it on the display. For example, the chat room may be displayed on the display such that the conversation is automatically scrolled to be displayed in the center of the screen.

Additionally or alternatively, in response to receiving the request for relevance information, the processor may extract, from the collected message information, at least one of a mention message by which the first user account mentions the second user account, or a mention message by which the second user account mentions the first user account. Thereafter, the processor may display the extracted mention message along with the information on the group chat room on the display. According to an example embodiment, in response to receiving a selection from the user for the mention message displayed on the display, the processor may move to the location of the mention message in the group chat room and display it on the display.

Additionally or alternatively, in response to receiving the request for relevance information, the processor may display, on the display, information on a plurality of chat rooms that includes the first user account and the second user account together. Additionally or alternatively, in response to receiving the request for relevance information, the processor may display, on the display, information on the third user account who is a friend of the first user account and the second user account.

Methods, non-transitory computer-readable mediums, and/or apparatuses (or systems according to some example embodiment may provide various information on the non-friend users, in addition to more than certain limited information such as profile images, names, and the like set by the non-friend users, may be easily provided by collecting, by a user terminal, message information in a group chat room that includes a first user account, a second user account, and one or more additional user accounts, and extracting, by the user terminal, conversation between the first user account and the second user account from the collected message information. Accordingly, relevance information between users, which include at least one non-friend user, may be easily provided by taking advantage of the messages exchanged between the users in a group chat room, without consuming excessive computing resources and/or communication resources.

The methods for providing relevance information between users described above may be provided as a computer program stored in a computer-readable recording medium for execution on a computer. The medium may continuously store a program executable by a computer or temporarily store a program for execution or download. Further, the medium may be a variety of recording means or storage means in a form in which a single piece of hardware or several pieces of hardware are combined, but is not limited to a medium directly connected to any computer system, and may be present on a network in a distributed manner. An example of the medium includes any that is configured to store program instructions, which may include a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. Further, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the example embodiments described above have been described as utilizing aspects of the currently disclosed subject matter in one or more standalone computer systems, example embodiments of the present disclosure are not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

Although the present disclosure has been described in connection with some example embodiments herein, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for providing relevance information between users, performed by one or more processors of a user terminal, comprising:
   receiving, by the user terminal, a request for the relevance information between a first user account and a second user account of an instant messaging application from a user of the user terminal, the relevance information including relation information between the first user account and the second user account and interaction information between the first user account and the second user account, the first user account being an account of a first user and the second user account being an account of a second user, the relation information including a list of one or more chat rooms that includes both the first user and the second user together and a list of one or more mutual friends of the first user and the second user, the interaction information including at least one of a conversation exchanged between the first user and the second user in a past or one or more messages in each of which both the first user and the second user are mentioned;
   collecting, by the user terminal, messages in a group chat room that includes the first user account, the second user account, and one or more additional user accounts;
   extracting, by the user terminal, conversation between the first user account and the second user account from the collected messages; and
   displaying, by the user terminal, the extracted conversation between the first user account and the second user account along with information on the group chat room on a display of the user terminal, wherein the first user account is associated with the user terminal.

2. The method according to claim 1, wherein the extracting comprises:
   calculating a correlation score between a first message of the first user account and a second message of the second user account using a language model; and
   in response to determining that the calculated correlation score is equal to or greater than a threshold value, extracting the first message and the second message as the conversation between the first user account and the second user account.

3. The method according to claim 1, wherein the receiving comprises:
   receiving the request for the relevance information from the user through a profile page of the second user account displayed on the display.

4. The method according to claim 1, further comprising:
   in response to receiving a selection from the user for the conversation displayed on the display, moving to a location of the conversation in the group chat room.

5. The method according to claim 1, further comprising:
   extracting at least one of a first mention message in which the first user account mentions the second user account or a second mention message in which the second user account mentions the first user account, from the collected messages; and
   displaying the extracted at least one of the first mention message or the second mention message along with the information on the group chat room, on the display.

6. The method according to claim 5, further comprising:
in response to receiving a selection of a mention message from the user from among the extracted at least one of the first mention message or the second mention message displayed on the display, moving to a location of the selected mention message in the group chat room.

7. The method according to claim 1, further comprising:
displaying information on a plurality of chat rooms that include both the first user account and the second user account on the display,
wherein the plurality of chat rooms includes the group chat room.

8. The method according to claim 1, further comprising:
displaying statistical information on the group chat room on the display,
wherein the statistical information on the group chat room includes at least one of,
an average number of messages input by the first user account per day in the group chat room,
an average number of messages input by the second user account per day in the group chat room,
an activity score of the group chat room,
an activity score of the first user account in the group chat room, or
an activity score of the second user account in the group chat room.

9. The method according to claim 8, wherein the activity score of the second user account in the group chat room is calculated based on,
a ratio of a number of messages of the second user account in the group chat room to a total number of messages in the group chat room,
a ratio of the number of messages of the second user account in the group chat room to a total number of messages in all chat rooms that include the second user account, and
a number of user accounts included in the group chat room.

10. The method according to claim 1, further comprising:
displaying information on a third user account who is the mutual friend of the first user account and the second user account on the display.

11. The method according to claim 1, further comprising:
in response to determining that the second user account is a non-friend of the first user account based on the relevance information, displaying the relevance information between the first user account and the second user account on a screen of a 1:1 chat room that includes the first user account and the second user account,
wherein the relevance information includes at least one of, information on a third user account who is the mutual friend of the first user account and the second user account,
the information on the group chat room that includes both the first user account and the second user account, or
information related to the extracted conversation between first user account and the second user account.

12. The method according to claim 1, further comprising:
displaying an authentication icon indicating that a profile image of the second user account is an image obtained by capturing a face of another user associated with the second user account, along with the profile image of the second user account, on the display.

13. The method according to claim 1, further comprising:
displaying access country information of the second user account along with a profile image of the second user account on the display.

14. The method according to claim 1, further comprising:
displaying a profile change icon indicating that a profile image of the second user account has changed within a period of time, along with the profile image of the second user account, on the display.

15. The method according to claim 1, further comprising:
calculating a similarity between profile information of a fourth user account who is a friend of the first user account and profile information of the second user account; and
in response to determining that the calculated similarity is equal to or greater than a threshold value, displaying an impersonation warning message on the display.

16. The method according to claim 1, further comprising:
determining a ranking in which the second user account is exposed in a recommended friend list based on an importance score of the second user account calculated based on the relevance information between the first user account and the second user account.

17. The method according to claim 16, wherein the importance score of the second user account is calculated based on at least one of,
the extracted conversation between the first user account and the second user account,
an activity score of the group chat room,
a number of chat rooms that include both the first user account and the second user account,
whether or not a profile image of the second user account is an image obtained by capturing a face of first another user associated with the second user account,
whether or not a face of second another user associated with the first user account is included in the profile image of the second user account,
a number of images including a face of a user associated with the second user account among images stored in the user terminal,
a number of times the first user account inputs a mention message mentioning the second user account in the group chat room, or
a number of times the second user account inputs a mention message mentioning the first user account in the group chat room.

18. The method according to claim 17, further comprising:
displaying information related to an item of a highest weight along with profile information of the second user account in the recommended friend list.

19. A non-transitory computer-readable recording medium storing instructions thereon that when executed by one or more processors, cause a computer to perform a method, the method comprising:
receiving a request for relevance information between a first user account and a second user account of an instant messaging application from a user of a user terminal, the relevance information including relation information between the first user account and the second user account and interaction information between the first user account and the second user account, the first user account being an account of a first user and the second user account being an account of a second user, the relation information including of one or more chat rooms that includes both the first user and the second user together and a list of one or more mutual friends of the first user and the second user, the interaction information including at least one of a conversation exchanged between the first user and the second user in a past or information on one or more messages in each of which both the first user and the second user are mentioned;

collecting messages in a group chat room that includes the first user account, the second user account, and one or more additional user accounts;

extracting conversation between the first user account and the second user account from the collected messages; and displaying the extracted conversation between the first user account and the second user account along with information on the group chat room on a display of the user terminal, wherein the first user account is associated with the user terminal.

20. A user terminal, comprising:

a memory configured to store one or more computer-readable programs;

a display; and one or more processors connected to the memory and configured to execute the one or more computer-readable programs included in the memory such that the one or more processors are configured to cause the user terminal to, collect messages in a group chat room that includes a first user account, a second user account, and one or more additional user accounts in response to a request for relevance information between the first user account and the second user account of an instant messaging application, the relevance information including relation information between the first user account and the second user account and interaction information between the first user account and the second user account, the first user account being an account of a first user and the second user account being an account of a second user, the relation information including of one or more chat rooms that includes both the first user and the second user together and a list of one or more mutual friends of the first user and the second user, the interaction information including at least one of a conversation exchanged between the first user and the second user in a past or information on one or more messages in each of which both the first user and the second user are mentioned, extract conversation between the first user account and the second user account from the collected messages, and display the extracted conversation between the first user account and the second user account along with information on the group chat room on the display, wherein the first user account is associated with the user terminal.

* * * * *